US012253225B1

(12) United States Patent
Li et al.

(10) Patent No.: US 12,253,225 B1
(45) Date of Patent: Mar. 18, 2025

(54) SIMULATED FLAME LAMP AND SIMULATED FLAME LAMP STAND

(71) Applicant: Chao Li, Guangdong (CN)

(72) Inventors: Chao Li, Guangdong (CN); Long Zhai, Guangdong (CN)

(73) Assignee: Chao Li, Shenzhen (CN)

( * ) Notice: Subject to any disclaimer, the term of this patent is extended or adjusted under 35 U.S.C. 154(b) by 0 days.

(21) Appl. No.: 18/958,920

(22) Filed: Nov. 25, 2024

(30) Foreign Application Priority Data

Sep. 4, 2024 (CN) ......................... 202422164785.8

(51) Int. Cl.

| | |
|---|---|
| ***F21S 10/04*** | (2006.01) |
| ***F21V 3/02*** | (2006.01) |
| ***F21V 3/06*** | (2018.01) |
| ***F21V 23/00*** | (2015.01) |
| ***H05B 47/155*** | (2020.01) |
| *F21Y 115/10* | (2016.01) |

(52) U.S. Cl.
CPC .............. *F21S 10/043* (2013.01); *F21V 3/02* (2013.01); *F21V 3/0625* (2018.02); *F21V 23/002* (2013.01); *H05B 47/155* (2020.01); *F21Y 2115/10* (2016.08)

(58) Field of Classification Search
CPC ........ F21S 10/043; F21S 10/04; F21S 10/046; F21V 3/0625; F21V 3/02; F21V 23/002; F21V 23/00; F21V 23/003; F21V 23/004; F21V 33/00; F21V 35/00; H05B 47/155; F21Y 2115/10; F21W 2121/00; F21W 2121/002
See application file for complete search history.

(56) References Cited

U.S. PATENT DOCUMENTS 7,125,142 B2 * 10/2006 Wainwright ........... H05B 45/20 362/276
9,739,432 B2 * 8/2017 Li ......................... F21S 10/043
10,928,024 B2 * 2/2021 Huang .................. F21V 23/004
11,761,598 B2 * 9/2023 Zhang ....................... F21K 9/20 362/227
12,078,303 B1 * 9/2024 Huang .................... F21S 6/001

FOREIGN PATENT DOCUMENTS

CN 205896959 U 1/2017
CN 207831243 U 9/2018

* cited by examiner

*Primary Examiner* — Bao Q Truong
(74) *Attorney, Agent, or Firm* — SHIMOKAJI IP

(57) ABSTRACT

A simulated flame lamp includes a dispersion lamp shade, a support having a mounting platform, a first illuminant, a second illuminant and a control IC. The first illuminant is configured to emit light toward a side wall of the dispersion lamp shade, and the second illuminant is located above the first illuminant and configured to emit light toward the side wall of the dispersion lamp shade. The first illuminant is always on when energized, and the light of the first illuminant is projected to a lower section of the side wall of the dispersion lamp shade; the control IC is configured to control the second illuminant to emit light at intervals so that the light of the second illuminant is projected to an upper section of the side wall of the dispersion lamp shade. The simulated flame lamp has simple structure, low cost and good simulation effect.

18 Claims, 8 Drawing Sheets

SIMULATED FLAME LAMP AND SIMULATED FLAME LAMP STAND

FIELD OF THE INVENTION

The present invention relates to a simulated lamp stand, and more particularly to a simulated flame lamp.

BACKGROUND OF THE INVENTION

The existing simulated flame lamp can simulate the flame burning effect through a variety of structural forms. For one way, light is emitted on the swinging flame sheet, and the swinging flame sheet is driven to swing by a driving mechanism, thereby achieving the flame burning effect. For another way, visual difference is used. Specifically, multiple lamp beads are arranged on a flame sheet that is fixed, and a control IC is configured to drive each lamp bead to flicker alternately, so as to visually show that the flame dances up and down to achieve the flame burning effect. Compared with the first way, the second way does not need a motor or electromagnetic coil and other driving mechanism, which effectively simplifies the structure of the lamp, and achieves better simulation effect. However, the second way requires large number of lamp beads, which increases the cost, and complicates the control ways for the lamp beads.

Therefore, there is a need to provide a simulation flame lamp with simple structure, low cost and good simulation effect.

SUMMARY OF THE INVENTION

One objective of the present invention is to provide a simulated flame lamp with simple structure, low cost and good simulation effect.

Another objective of the present invention is to provide a simulated flame lamp stand with simple structure, low cost and good simulation effect.

To achieve the mentioned above objectives, the present invention provides a simulated flame lamp including a dispersion lamp shade, a support, a first illuminant, a second illuminant and a control IC. The support is provided with a mounting platform, the dispersion lamp shade is arranged outside the mounting platform, the first illuminant is arranged on a lower side of the mounting platform and configured to emit light toward a side wall of the dispersion lamp shade which is located around the lower side of the mounting platform. The second illuminant is located above the first illuminant, arranged on an upper side of the mounting platform and configured to emit light toward the side wall of the dispersion lamp shade which is located around the upper side of the mounting platform. The first illuminant is always on when energized, and the light of the first illuminant is projected to a lower section of the side wall of the dispersion lamp shade. The control IC is arranged on the mounting platform and electrically connected with the second illuminant, and configured to control the second illuminant to emit light at intervals so that the light of the second illuminant is projected to an upper section of the side wall of the dispersion lamp shade.

In the present invention, the first illuminant is arranged on the lower side of the mounting platform, configured to always emit light when energized, and emit light toward the side wall of the dispersion lamp shade which is located around the lower side of the mounting platform. In such a way, a first flame projection is formed around the side wall of the lower section of the dispersion lamp shade. The second illuminant is arranged on the upper side of the mounting platform so that the second illuminant is located above the first illuminant, so as to emit light to the side wall of the dispersion lamp shade which is located around the upper side of the mounting platform. In such a way, a second flame projection is formed around the side wall of the upper section of the dispersion lamp shade. Moreover, by controlling IC to control the flicker of the second illuminant, the second flame projection appears intermittently, so that when the second flame projection appears, it can form a longer flame effect than the first flame projection, and the length is longer than that when only the first flame projection appears. In such a way, different lengths of the first and second flame projections can result in visual differences, thereby generating the flame burning effect on the dispersion lamp shade that the flame dances up and down. The first illuminant and the second illuminant are respectively arranged on the upper and lower sides of the mounting platform, thus it just requires two lamp beads to simulate the flame burning effect. Compared with the prior art, the number of lamp beads is effectively reduced. Furthermore, the flame burning effect can be simulated by merely controlling one of the lamp beads to flicker, thus the control is simple to reduce the cost of the entire simulation flame stand.

Preferably, the simulated flame lamp further includes an epoxy resin package which is wrapped outside the mounting platform to encapsulate the first illuminant and the second illuminant. By using the epoxy resin package to encapsulate the mounting platform, the first illuminant and the second illuminant, thereby forming an integrated structure, protecting the first illuminant and the second illuminant, and effectively extending the service life of the flame lamp.

Preferably, the epoxy resin package has an upper end face which is flat.

Preferably, the epoxy resin package has an upper end face which is concave. In such a way, the upper end face of the epoxy resin package is configured as a concave structure so that the epoxy resin package forms a concave lens, thereby diffusing the light of the second illuminant to the surrounding areas, that is, guiding the light to project to the surrounding areas of the upper section of the dispersion lamp shade, so that the light around the middle and upper sections of the dispersion lamp shade is more concentrated than the middle and lower sections, and the light color is darker than other areas, which can better simulate the visual effect that the outer flame is darker than the inner flame to obtain the improved simulation effect.

Preferably, the upper end face of the epoxy resin package is cone, arc or spherical.

Preferably, the first illuminant is an SMD-type LED light emitting chip, and a lamp bead of the first illuminant is oriented away from a direction of the second illuminant; the second illuminant is an LED light-emitting chip, and a lamp bead of the second illuminant are oriented away from a direction of the first illuminant. By using the SMD-type LED light emitting chip as the first illuminant, the lamp bead of the first illuminant is set downward, and the lamp bead of the second illuminant is set upward, so that the light emitted by the two illuminants can form two layers on the dispersion lamp shade, but is visually continuous. Thus, when the second illuminant flickers, the lengths of the light from the illuminant are different so to achieve the flame burning effect of the flame dancing up and down.

Preferably, the support is provided with a positive electrode support leg and a negative electrode support leg, and the mounting platform is arranged between the positive electrode support leg and the negative electrode support leg;

the positive electrode support leg is connected with the first illuminant and a positive electrode of the control IC respectively, and the negative electrode support leg is connected with the first illuminant and a negative electrode of the control IC respectively. By using the support legs of the support as conductive pins, both support and connection are realized, thereby simplifying the internal structure and improving the convenience of assembly.

Preferably, the dispersion lamp shade is a bulb shell, and a diameter of the bulb shell is gradually reduced from bottom to top. In such an arrangement, the shape of the simulate flame is more realistically and the simulation effect is improved.

Preferably, the upper side of the mounting platform is provided with a groove, and the second illuminant is arranged in the groove. The groove can be used to hold phosphors to achieve the purpose of adjusting the color of the light.

Accordingly, the present invention provides a simulated flame lamp stand including a lamp stand body, a power supply and the simulated flame lamp mentioned above. The simulated flame lamp is arranged at an upper end of the lamp stand body, and the dispersion lamp shade is extended beyond the upper end of the lamp stand body, the power supply is arranged in the lamp stand body and electrically connected with the first illuminant and the control IC.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
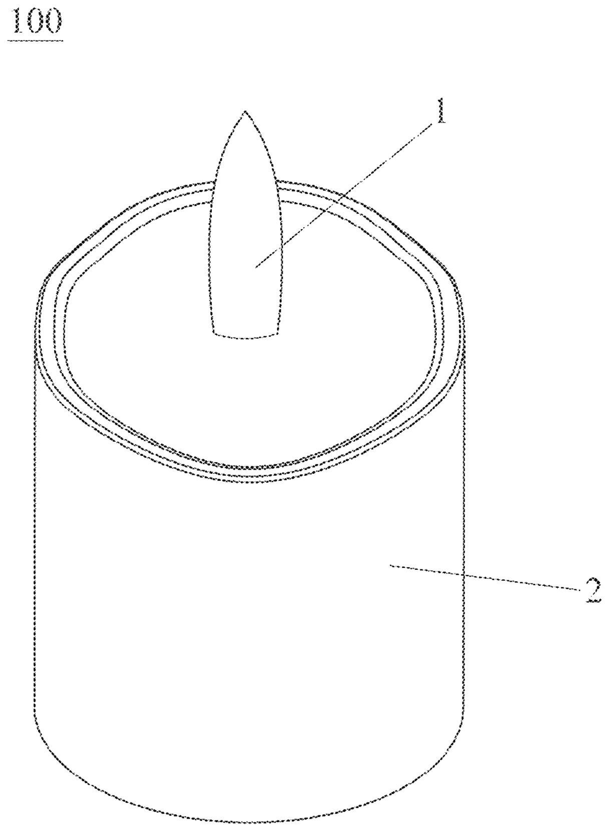
FIG. 1 is a perspective view of the simulated flame lamp stand according to an embodiment of the present invention.
Figure 2:
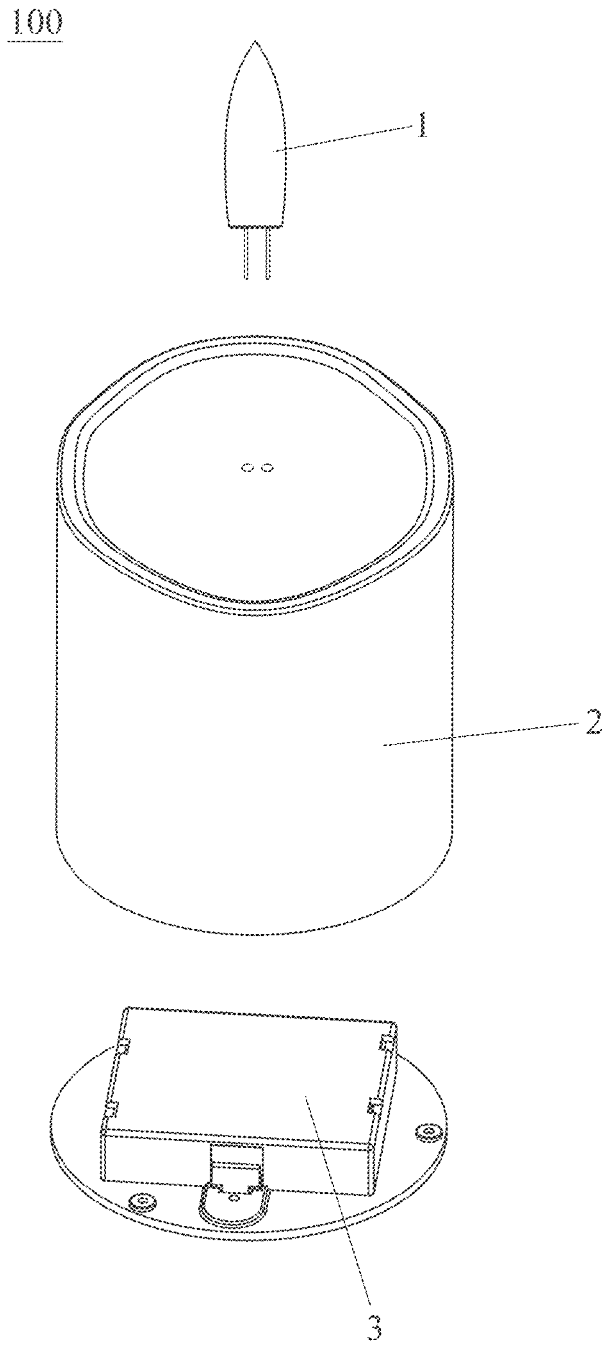
FIG. 2 is an exploded view of the simulated flame lamp stand according to the present invention.

The present invention will be described in detail below with reference to the accompanying drawings and preferred embodiments.

As shown in FIG. 1 to FIG. 8, the simulated flame lamp stand 100 of the present invention includes a simulated flame lamp 1, a lamp stand body 2 and a power supply 3, wherein the lamp stand body 2 has a hollow structure. The simulated flame lamp 1 is arranged at an upper end of the lamp stand body 2, and the dispersion lamp shade 11 is extended beyond the upper end of the lamp stand body 2. The power source 3 is arranged in the lamp stand body 2 and electrically connected with the simulated flame lamp 1. Specifically, the simulated flame lamp 1 includes a dispersion lamp shade 11, a support 12, a first illuminant 13, a second illuminant 14 and a control IC 15. The support 12 is provided with a mounting platform 121, and the dispersion lamp shade 11 which is milky white is arranged outside the mounting platform 121. Specifically, the dispersion lamp shade 11 is a bulb shell, and the diameter of the bulb shell gradually decreases from bottom to top. In such an arrangement, the shape of the simulate flame is more realistically and the simulation effect is improved. The first illuminant 13 is arranged on the lower side of the mounting platform 121 and emits light towards the side wall of the dispersion lamp shade 11 which is located around the lower side of the mounting platform 121. The second illuminant 14 is located above the first illuminant 13 and arranged on the upper side of the mounting platform 121 to illuminate the side wall of the dispersion lamp shade 11 which is located around the upper side of the mounting platform 121. The first illuminant 13 is always on when energized and the light of the first illuminant 13 is projected to a lower section of the side wall of the dispersion lamp shade 11. The control IC 15 is arranged on the mounting platform 121 and electrically connected with the second illuminant 14, and the control IC 15 is configured to control the second illuminant 14 to emit light at intervals so that the light of the second illuminant 14 is projected to an upper section of the side wall of the dispersion lamp shade 11.

Referring to FIGS. 3, 4, 5 and 7, the first illuminant 13 is a surface mounted device (SMD) type (SMD-type) LED light emitting chip, which can be affixed to the bottom surface of the lower side of the mounting platform 121, or located on the lower side of the mounting platform 121 and fixed on the support 12. The first illuminant 13 includes a lamp bead. The lamp bead of the first illuminant 13 is oriented away from a direction of the second illuminant 14. The second illuminant-emitting body 14 is an LED light emitting chip, and the second illuminant-emitting body 14 includes a lamp bead. The lamp bead of the second illuminant 14 is oriented away from a direction of the first illuminant. Therefore, by using the SMD-type LED light emitting chip as the first illuminant 13, the lamp bead of the first illuminant 13 is set downward, and the lamp bead of the second illuminant 14 is set upward, so that the light emitted by the two illuminants can form two layers on the dispersion lamp shade 11, but is visually continuous. Thus, when the second illuminant 14 flickers, the lengths of the light from the illuminant are different so to achieve the flame burning effect of the flame dancing up and down.

Figure 3:
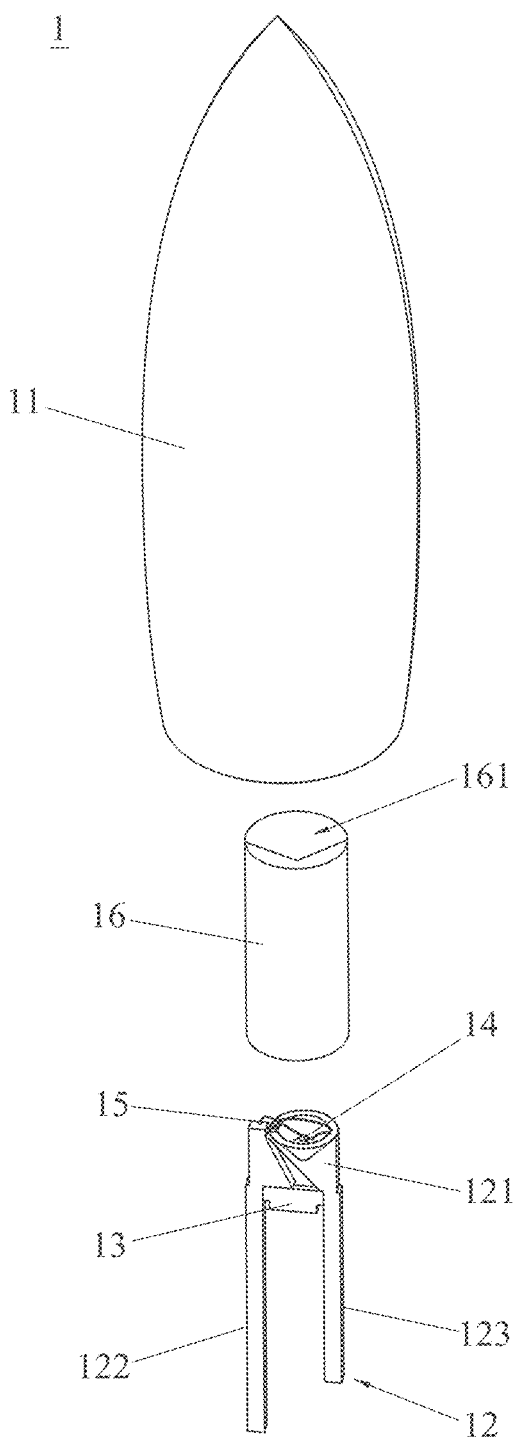
FIG. 3 is an exploded view of the simulated flame lamp according to the present invention.
Figure 4:
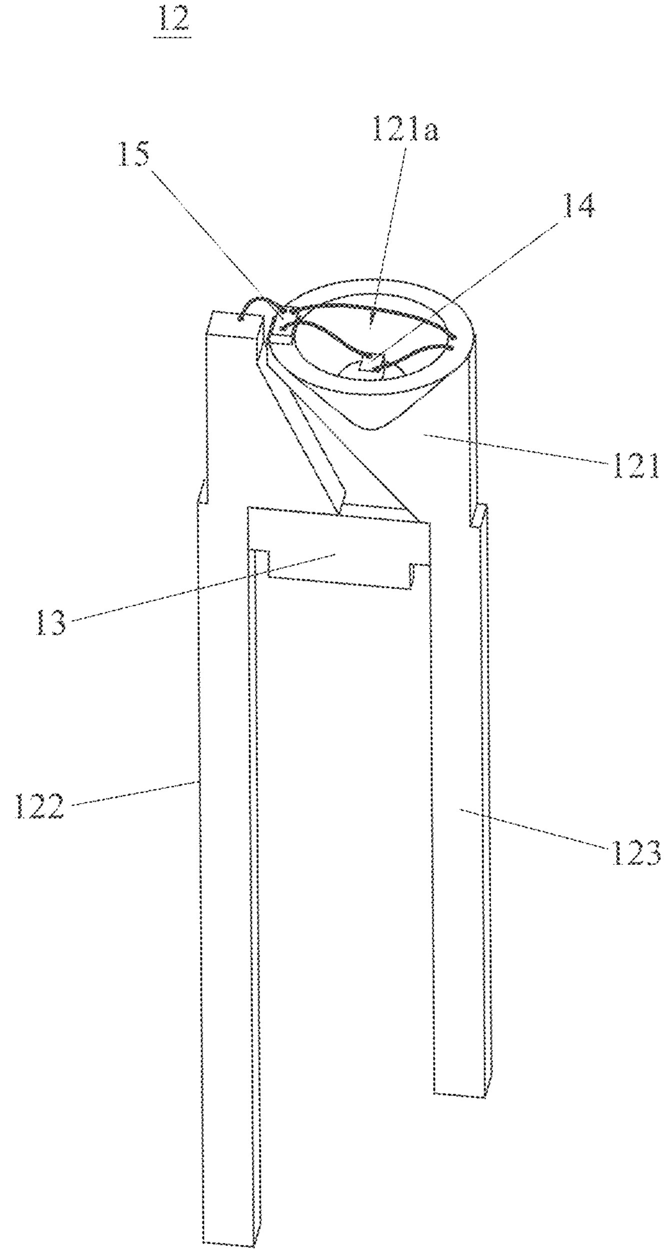
FIG. 4 is a schematic view of the support of the simulated flame lamp according to the present invention.
Figure 5:
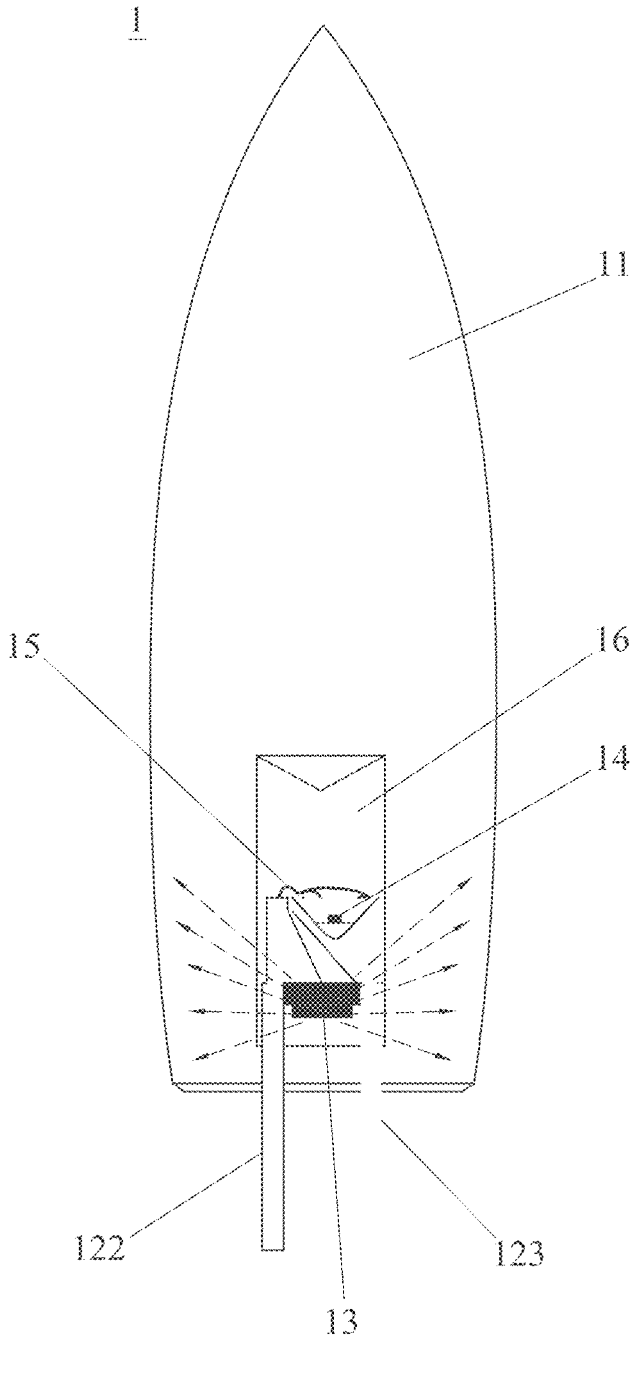
FIG. 5 is a light distribution diagram of the simulated flame lamp of the present invention when the first illuminant is luminous.
Figure 6:
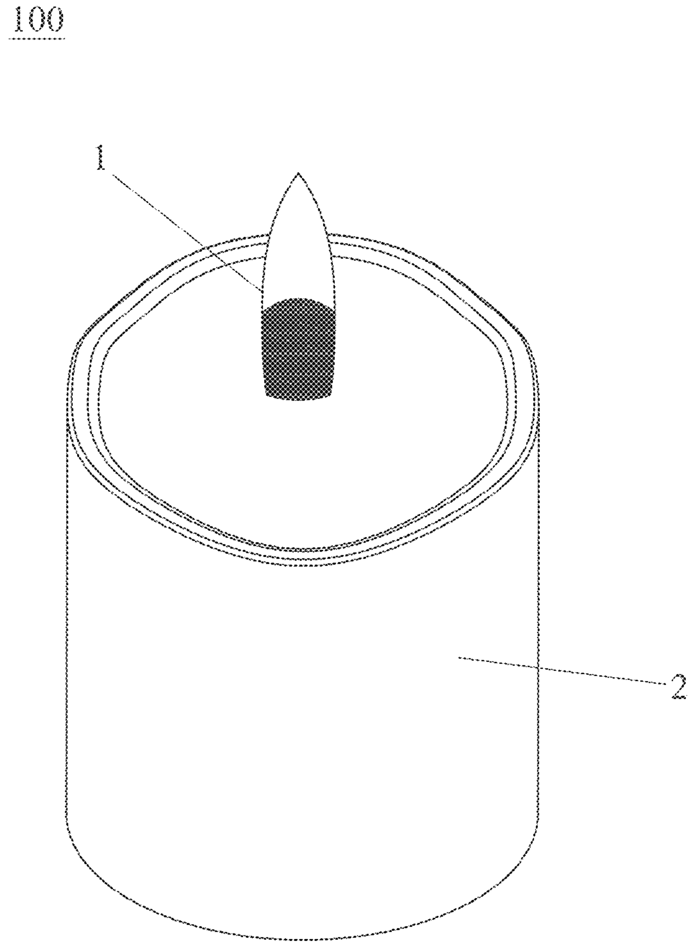
FIG. 6 is the effect diagram of the simulated flame lamp stand of the present invention when the first illuminant is luminous.
Figure 7:
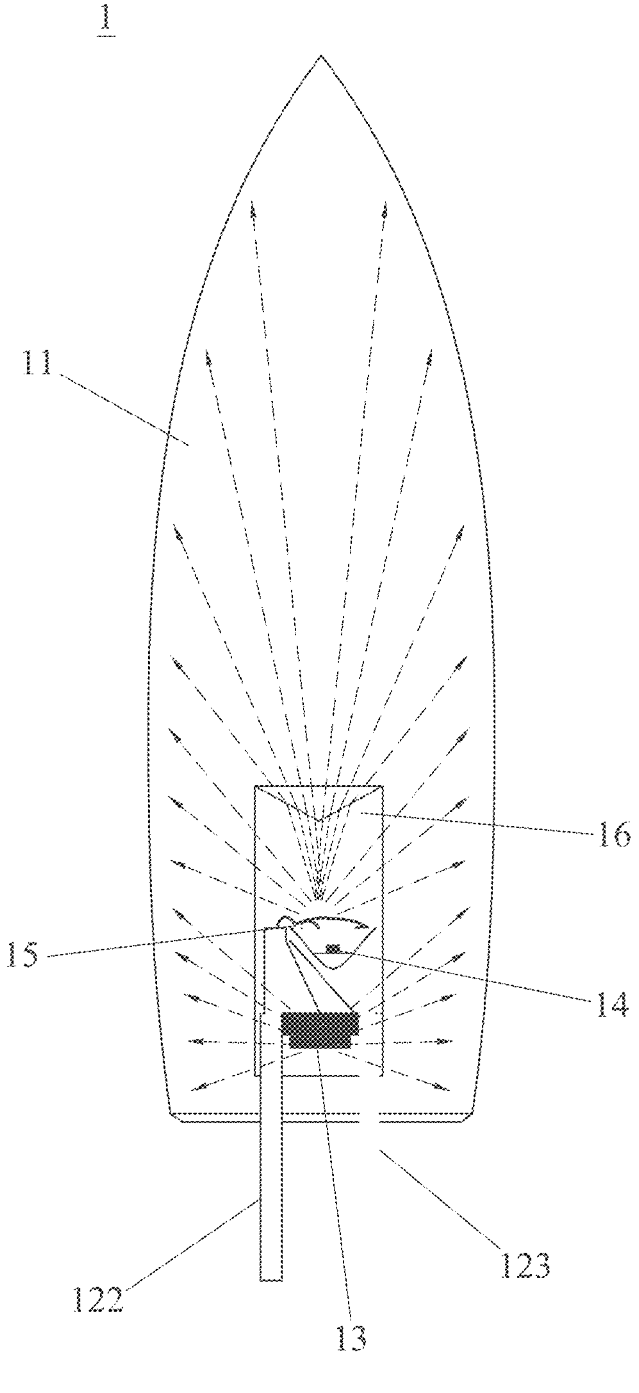
FIG. 7 is the light distribution diagram of the simulated flame lamp of the present invention when the first illuminant and the second illuminant are luminous simultaneously.
Figure 8:
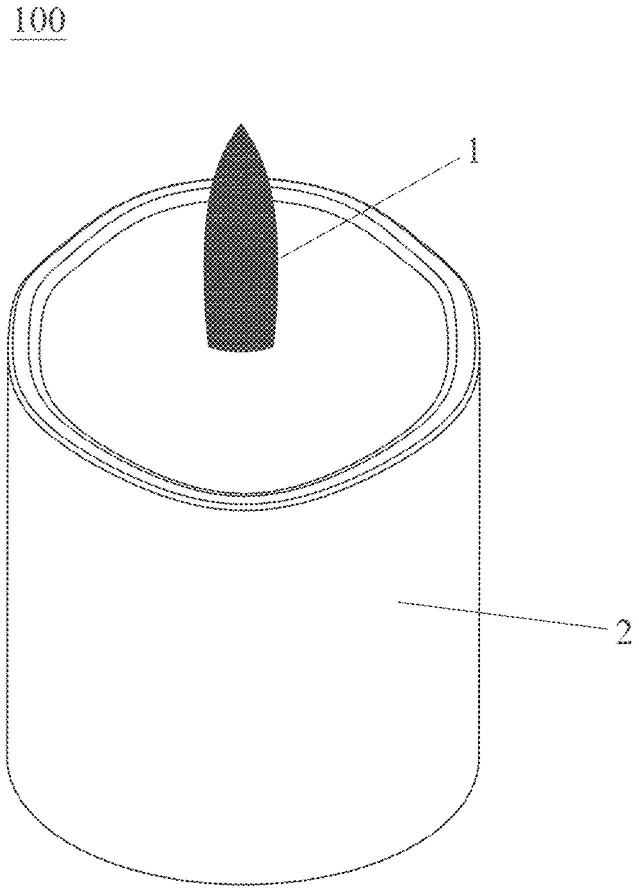
FIG. 8 is the effect diagram of the simulated flame lamp stand when the first illuminant and the second illuminant are luminous simultaneously.

Referring to FIGS. 3, 4, and 7, the simulated flame lamp 1 further includes an epoxy resin package 16, which is wrapped outside the mounting platform 121 to encapsulate the first illuminant 13 and the second illuminant 14. By using an epoxy resin package 16 to package the mounting platform 121, the first illuminant 13 and the second illuminant 14, the four can be relatively fixed and form an integrated structure for easy installation, and the first illuminant 13 and the second illuminant 14 can be protected, thereby effectively extending the service life of the flame lamp. The epoxy resin package 16 is cylindrical and transparent. Alternatively, the upper end face of the epoxy resin package body 16 is flat or is a concave structure. In the present embodiment, the upper face of the epoxy resin package 16 has a concave structure 161. The concave surface 161 may be cone, arc or spherical. In such a way, the upper end face of the epoxy resin package 16 is configured as a concave structure so that the epoxy resin package 16 forms a concave lens, thereby diffusing the light of the second illuminant 14 to the surrounding areas, that is, guiding the light to project to the surrounding areas of the upper section of the dispersion lamp shade 11, so that the light around the middle and upper sections of the dispersion lamp shade 11 is more concentrated than the middle and lower sections, and the light color is darker than other areas, which can better simulate the visual effect that the outer flame is darker than the inner flame to obtain the improved simulation effect.

Referring to FIGS. 3 and 4, the support 12 is provided with a positive electrode support leg 122 and a negative electrode support leg 123, the mounting platform 121 is arranged between the positive electrode support leg 122 and the negative electrode support leg 123, and the positive electrode support leg 122 is electrically connected with the positive electrode of the power supply 3, the first illuminant 13 and the positive electrode of the control IC 15, respectively. The negative electrode support leg 123 is electrically connected with the negative electrode of the power supply 3, the first illuminant 13, and the negative electrode of the control IC 15, respectively. By using the support legs of the support 12 as conductive pins, both support and connection are realized, thereby simplifying the internal structure and improving the convenience of assembly.

In addition, as shown in FIG. 4, the upper side of the mounting platform 121 is provided with a groove 121*a*, the second illuminant 14 is arranged in the groove 121*a*, and the control IC 15 is arranged outside the groove 121*a*. The groove 121*a* can be used to hold phosphors to achieve the purpose of adjusting the color of the light. The groove 121*a* in this embodiment has an inverted conical structure. In another embodiment, the mounting platform 121 can also be provided without the groove 121*a* and the phosphors, and the second illuminant 14 can achieve the same function only by selecting an LED lamp that can emit colored light.

Combined with FIG. 5 to FIG. 8, in the present invention, the first illuminant 13 is arranged on the lower side of the mounting platform 121. Specifically, the first illuminant 13 is configured to always emit light when energized, and emit light toward the side wall of the dispersion lamp shade 11 which is located around the lower side of the mounting platform 121, in such a way, a first flame projection is formed around the side wall of the lower section of the dispersion lamp shade 11. The second illuminant 14 is arranged on the upper side of the mounting platform 121 so that the second illuminant 14 is located above the first illuminant 13, so as to emit light to the side wall of the dispersion lamp shade 11 which is located around the upper side of the mounting platform 121, in such a way, a second flame projection is formed around the side wall of the upper section of the dispersion lamp shade 11. Moreover, by controlling IC 15 to control the flicker of the second illuminant 14, the second flame projection appears intermittently, so that when the second flame projection appears, it can form a longer flame effect than the first flame projection, and the length is longer than that when only the first flame projection appears. In such a way, different lengths of the first and second flame projections can result in visual differences, thereby generating the flame burning effect on the dispersion lamp shade 11 that the flame dances up and down. The first illuminant 13 and the second illuminant 14 are respectively arranged on the upper and lower sides of the mounting platform 121, thus it just requires two lamp beads to simulate the flame burning effect. Compared with the prior art, the number of lamp beads is effectively reduced. Furthermore, the flame burning effect can be simulated by merely controlling one of the lamp beads to flicker, thus the control is simple to reduce the cost of the entire simulation flame stand 100.

The control principle of the control IC 15 involved in the simulation flame lamp stand 100 of the present invention is well known to persons ordinary skilled in the field, which will not be explained in detail therefore.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A simulated flame lamp, comprising a dispersion lamp shade, a support, a first illuminant, a second illuminant and a control IC; wherein the support is provided with a mounting platform; the dispersion lamp shade is arranged outside the mounting platform; the first illuminant is arranged on a lower side of the mounting platform and configured to emit light toward a side wall of the dispersion lamp shade which is located around the lower side of the mounting platform; the second illuminant is located above the first illuminant, arranged on an upper side of the mounting platform and configured to emit light toward the side wall of the dispersion lamp shade which is located around the upper side of the mounting platform; the first illuminant is always on when energized, and the light of the first illuminant is projected to a lower section of the side wall of the dispersion lamp shade; the control IC is arranged on the mounting platform and electrically connected with the second illuminant, and configured to control the second illuminant to emit light at intervals so that the light of the second illuminant is projected to an upper section of the side wall of the dispersion lamp shade.

2. The simulated flame lamp according to claim 1, further comprising an epoxy resin package which is wrapped outside the mounting platform to encapsulate the first illuminant and the second illuminant.

3. The simulated flame lamp according to claim 1, wherein the epoxy resin package has an upper end face which is flat.

4. The simulated flame lamp according to claim 1, wherein the epoxy resin package has an upper end face which is concave.

5. The simulated flame lamp according to claim 4, wherein the upper end face of the epoxy resin package is cone, arc or spherical.

6. The simulated flame lamp according to claim 1, wherein the first illuminant is an SMD-type LED light emitting chip, and a lamp bead of the first illuminant is oriented away from a direction of the second illuminant; the second illuminant is an LED light-emitting chip, and a lamp bead of the second illuminant are oriented away from a direction of the first illuminant.

7. The simulated flame lamp according to claim 1, wherein the support is provided with a positive electrode support leg and a negative electrode support leg, and the mounting platform is arranged between the positive electrode support leg and the negative electrode support leg; the positive electrode support leg is connected with the first illuminant and a positive electrode of the control IC respectively, and the negative electrode support leg is connected with the first illuminant and a negative electrode of the control IC respectively.

8. The simulated flame lamp according to claim 1, wherein the dispersion lamp shade is a bulb shell, and a diameter of the bulb shell is gradually reduced from bottom to top.

9. The simulated flame lamp according to claim 1, wherein the upper side of the mounting platform is provided with a groove, and the second illuminant is arranged in the groove.

10. A simulated flame lamp stand, comprising a lamp stand body, a power supply and the simulated flame lamp according to claim 1, wherein the simulated flame lamp is arranged at an upper end of the lamp stand body, and the dispersion lamp shade is extended beyond the upper end of the lamp stand body, the power supply is arranged in the lamp stand body and electrically connected with the first illuminant and the control IC.

11. The simulated flame lamp according to claim 10, further comprising an epoxy resin package which is wrapped outside the mounting platform to encapsulate the first illuminant and the second illuminant.

12. The simulated flame lamp stand according to claim 10, wherein the epoxy resin package has an upper end face which is flat.

13. The simulated flame lamp stand according to claim 10, wherein the epoxy resin package has an upper end face which is concave.

14. The simulated flame lamp stand according to claim 13, wherein the upper end face of the epoxy resin package is cone, arc or spherical.

15. The simulated flame lamp stand according to claim 10, wherein the first illuminant is an SMD-type LED light emitting chip, and a lamp bead of the first illuminant is oriented away from a direction of the second illuminant; the second illuminant is an LED light-emitting chip, and a lamp bead of the second illuminant are oriented away from a direction of the first illuminant.

16. The simulated flame lamp stand according to claim 10, wherein the support is provided with a positive electrode support leg and a negative electrode support leg, and the mounting platform is arranged between the positive electrode support leg and the negative electrode support leg; the positive electrode support leg is connected with the first illuminant and a positive electrode of the control IC respectively, and the negative electrode support leg is connected with the first illuminant and a negative electrode of the control IC respectively.

17. The simulated flame lamp stand according to claim 10, wherein the dispersion lamp shade is a bulb shell, and a diameter of the bulb shell is gradually reduced from bottom to top.

18. The simulated flame lamp stand according to claim 1, wherein the upper side of the mounting platform is provided with a groove, and the second illuminant is arranged in the groove.

* * * * *